United States Patent [19]

Sasaki et al.

[11] Patent Number: 4,860,217

[45] Date of Patent: Aug. 22, 1989

[54] METHOD AND SYSTEM FOR EFFECTING A TRANSFORMATION OF A VIDEO IMAGE

[75] Inventors: Nobuo Sasaki; Tetsuzo Kuragano; Nobuyuki Minami, all of Kanagawa, Japan

[73] Assignee: Sony Corporation, Tokyo, Japan

[21] Appl. No.: 812,341

[22] Filed: Dec. 23, 1985

[30] Foreign Application Priority Data

Dec. 27, 1984 [JP] Japan .................................. 59-281225

[51] Int. Cl.⁴ ............................................. G06F 3/14
[52] U.S. Cl. .................................... 364/518; 340/723; 340/798; 364/522; 382/44; 382/46
[58] Field of Search .................... 364/518, 521, 522; 340/724, 723, 727, 750, 798, 799; 382/45, 46, 47, 49

[56] References Cited

U.S. PATENT DOCUMENTS

| | | | |
|---|---|---|---|
| 3,976,982 | 8/1976 | Eiselen | 382/46 X |
| 4,168,488 | 9/1979 | Evans | 364/521 X |
| 4,283,765 | 8/1981 | Rieger | 364/521 |
| 4,475,104 | 10/1984 | Shen | 340/729 |
| 4,484,347 | 11/1984 | Kashioka | 382/46 X |
| 4,594,673 | 6/1986 | Holly | 364/522 |
| 4,625,290 | 11/1986 | White | 364/521 X |
| 4,653,013 | 3/1987 | Collins et al. | 364/518 |
| 4,685,070 | 8/1987 | Flinchbaugh | 364/518 X |

*Primary Examiner*—Gary V. Harkcom
*Assistant Examiner*—H. R. Herndon
*Attorney, Agent, or Firm*—Ronald P. Kananen

[57] ABSTRACT

A method and system for effecting a transformation of video image on a video screen applicable to a system for producing a special visual effect on, e.g., a television screen, in which a two-dimensional address plane is defined within a memory area, input video image is stored within the memory area, a cylinder shaped virtual image is placed on the address plane, a part of the address plane is wound on the cylinder shaped image, and when the cylinder shaped image is displaced along a predetermined direction on the address plane with a radius of a circle in vertical section thereof being varied with time, the address plane can be viewed as if it were turned over. If the input address data within the memory area is read out on the basis of output address data indicating the above-described displacement of the address plane, the output video image on the video screen can be viewed therethrough as if the video image were being turned over.

21 Claims, 6 Drawing Sheets

METHOD AND SYSTEM FOR EFFECTING A TRANSFORMATION OF A VIDEO IMAGE

BACKGROUND OF THE INVENTION

The present invention relates generally to a method and system for effecting a transformation of a video image from an original image on a TV screen applicable, for example, a system for producing a special visual effect on a television screen in a television broadcasting station.

Such a kind of special visual effect system has been proposed in which image signals in a standard television method constructed so as to form a piece of two-dimensional image having a rectangular shape are converted into digital signals. Thereafter the digital image signals are read in predetermined address locations generated within an input image memory having a memory capacity corresponding to one field. When the output image data are read out by accessing the input image memory to read out the read-in data in an order changed from the read in order according to the necessity to display the output image data on the screen of a display unit, a piece of image having a special effect such that an image derived from input image data is geometrically changed can be displayed.

In this case, a read-out address signal for the input image memory is generated by means of a read-out address transform circuit for transforming the input image address of the input image data according to the necessity.

As the read-out address transform circuit, a circuit is used in which with a three-dimensional surface data previously stored on the basis of a concept such that on the basis of input image data generating a plane image, the input image data are converted into a three-dimensional surface and a calculation to map the input image on the three-dimensional surface using the three-dimensional surface data is achieved by software calculating means.

However, there are problems in the conventional read-out address transform circuit. That is to say, a large scale of memory is not only required as a storage means for storing the three dimensional surface data but also the transform calculation for many picture elements constituting the displayed image need to be executed so that a large-sized and complicated construction of the whole special effect system cannot be avoided.

Especially, in a case when the whole screen on which the input video image is displayed is transformed into a video screen which can be viewed as if the screen were three-dimensionally inflexed, the inflexed surface being varied with time, an oversized construction of the special visual effect system exceeding a practical capacity range cannot be avoided. Therefore, it is desirable to provide a method and system for effecting a transformation of the video image which achieves a practically sufficient special visual effect described with a simple hardware construction in place of various conventional software methods.

SUMMARY OF THE INVENTION

With these problems in mind, it is an object of the present invention to provide a system and method for effecting a transformation of a video image on a video screen which can remarkably reduce a scale of the special effect system as compared with the above-described system and in which a plane image formed with the input image data is converted into an image signal having an effect such that an image on the screen can be viewed as if a page of a book were turned over. This is referred to as a "page turn-over effect."

This effect can be achieved by a method for effecting a transformation of a video image on a Video screen, which comprises the steps of: (a) storing an input video image in a memory device; (b) defining a two-dimensional address plane in a memory area of the memory device; (c) providing a first line on the address plane to divide the address plane into first and second regions; (d) providing second and third lines on the first and second regions of the address plane in parallel to the first line; (e) calculating address data of the address plane for providing transferred address data so that the address data of the first region are symmetrically transformed with respect to the first line, and the address data between the first and second lines and between the first and third lines are non-linear compression transformed along an axis perpendicular to the first line; (f) calculating transformed address data between the first and second lines and between the first and third lines when address data between the first and second lines and between the first and third lines are non-linear compression transformed along an axis perpendicular to the first line; and (g) reading out the input video image from the memory device data and generating an output video image according to the transformed address data, whereby the output image can be viewed such as to be turned over along the first line.

This can be achieved by a system for effecting a transformation of a video image on a video screen, which comprises (a) first means for storing input image data. (b) second means for sequentially generating a positional output image address signal, (c) third means for presetting parameters representing a locus on which an output of the video image is turned over as if a sheet of paper were folded up, (d) fourth means for sequentially generating position designation signals indicative of a displacement of the input image on a two-dimensional plane, (e) fifth means for calculating values including a positional reference point signal of the input image on the two-dimensional plane on the basis of which the input image is displaced, rotation transform matrix data based on a given angle through which the two-dimensional plane is rotated, and a radius data on a virtual cylindrical image on which part of the input image is wound, the positional reference point signal, the rotation transform matrix data, and the radius data being based on preset parameters drived from the third means and position designation signals derived from the fourth means, (f) sixth means for executing transform arithmetic operations for transformable parts of an output video image, the transformable parts being defined by a first part representing a rear part of the output video image which is wound on an upper surface of the cylindrical image as viewed through the video screen, a second part representing a front part of the output video image which is outside of a projection portion of the cylindrical image, a third part representing the front part of the output video image which is wound on a lower surface of the cylindrical image as viewed through the video screen, and a fourth part representing the rear part of the output image which is outside of the wound first part so as to overlap on the second part, on the basis of the reference point signal, rotation transform matrix data. and radius data of the cylindrical image calculated by the fifth means and reading out the input image data the contents of which are to be the output image and specified by the positional output image address signal generated by the second means, and (g) seventh means for displaying the input video image whose data are stored in the first means and read out from the first means by the sixth means according to the positional output image address signal on the video screen so that the whole video screen can be viewed as if a sheet of paper were being folded up.

This can also be achieved by a method for effecting a transformation of a video image on a video screen, comprises the steps of:

(a) defining a two-dimensional address plane within a memory area;

(b) storing an input video image within the memory area so that data on each picture element thereof is placed at the corresponding address;

(c) virtually placing a cylinder-shaped image whose radius of a section thereof is varied on the address plane defined in the step (a) and winding a part of the address plane on the cylinder shaped image;

(d) displacing the cylinder-shaped image along a predetermined direction on the address plane with its radius varied with time so that the address plane is turned over along the predetermined direction;

(e) transforming parallel translation and rotation for the whole address plane, a non-linear compression with respect to the predetermined direction for front and rear parts of the address plane which are wound on a surface of the cylinder shaped image as viewed vertically through the video screen, and a fold back of the rear part of the address plane;

(f) inverse transforming the transformed address data obtained in the step (e) so as to unfold the output video image and reading out inverse transformed image address data with a priority taken for the turned over part of output image as input image address data; and (g) displaying the input image on the video screen on the basis of the input image address, whereby the video image on the video screen can be viewed as if a page were turned over.

BRIEF DESCRIPTION OF THE DRAWINGS

A more complete understanding of the present invention may be obtained from the following description taken in conjunction with the attached drawings and in which like reference numerals designate corresponding elements and in which.

DETAILED DESCRIPTION OF THE PREFERRED EMBODIMENT

Reference will hereinafter be made to the drawings in order to facilitate an understanding of the present invention.

Figure 7:
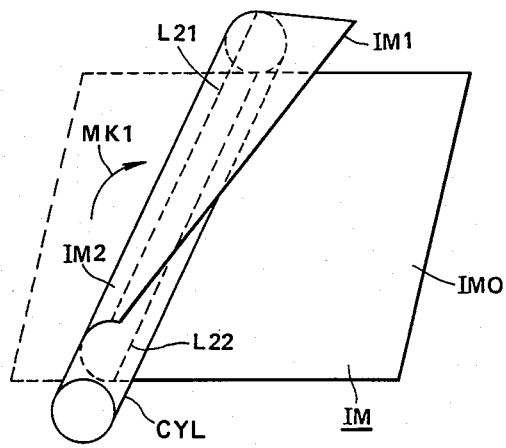
FIGS. 7 and 8 are schematic diagrams for explaining a model of the image signal transform method according to the present invention.
Figure 8:
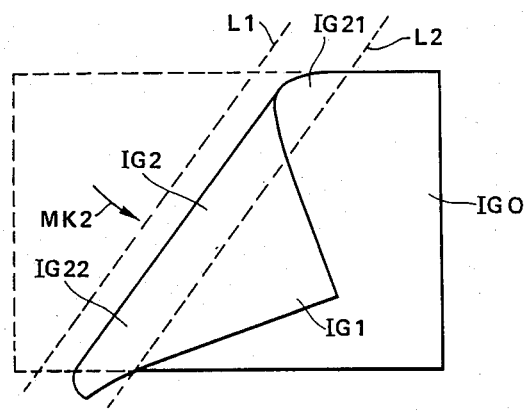

In a method for effecting a transformation of a video image according to the present invention, a positional relationship of each picture element on a video screen between input picture image data and output image data is modeled on the basis of a technique shown in FIG. 7 and FIG. 8.

Suppose that a virtual cylindrical image CYL is mounted on an input image IM represented by input image data so as to cross the input image IM obliquely. In addition, one end IM1 of the input image IM is folded and wound around the cylindrical image CYL. A screen in a state in which the end IM1 described above is wound around the cylindrical image CYL is viewed from an upward position in a vertical direction with respect to an unwound part of the screen IMO. A construction of the screen in this case can provide a visual effect such that an image represented by a piece of paper can be visualized as if it were gradually turned over.

In more detail, simultaneously when a center axis of the cylindrical image CYL is translated in parallel to a direction in which one page of a book is turned, a diameter of the cylindrical image CYL is increased according to an increase in distance of the parallel translation of the cylindrical image CYL.

One sheet of image is thus turned over obliquely from one of the corners. As the turned sheet part of image becomes large as compared with the remaining sheet part, a diameter of a part of image IM2 currently wound on the cylindrical image CYL continued from the folded part of image IM1 becomes gradually varied and the position of the cylindrical image CYL is accordingly moved in a page turned over direction denoted by an arrow MK1.

As shown in FIG. 7, suppose that with the part of the image IM wound on the cylindrical image CYL, the contents of the whole image on the screen when viewing the screen on which the part of image is wound on the cylindrical image from a position vertical to a plane of the part of image IM. In this case, an unfolded part of the image IG0 remains unchanged without image alteration by a compression, shift, and rotation. On the other hand, a part of the image IG1 folded back over the part of image IG0 indicates inversely projected contents of, e.g., part of image IG0. In addition, a part of image IG21 located below the part of image IM2 (refer to FIG. 7) wound on the cylindrical image CYL has projected contents of the image before the part of image IMO is wound on the cylindrical image CYL without folding back of image and which is subjected to a non-linear compression. In addition, the upper part of image IG22 has projected contents with the folding back of the previous image IG0 before winding on the image CYL and with a non-linear compression in image.

When the effect of page turning over is modeled as shown in FIG. 8, the contents of the part of image IG2 wound on the cylindrical image CYL can be achieved if the contents of the image before the folding back of the original image is processed by way of a one dimensional non-linear compression only for a direction (represented by an arrow mark MK2) orthogonal to a fold line L1 on a plane including the part of image IG0 with respect to the fold line L1, i.e., a straight line parallel to a center axis of the cylindrical image CYL. For the transform processing when each picture element constituting the image on the screen is mapped on the part of the wound part of image IG2, the non-linear compression transform may be executed only for one axial direction, i.e., the direction MK2 orthogonal to the fold line L1.

The one-axis direction non-linear compression transform processing may be executed over the confines from the fold line L1 through first and second non-linear compression parts of images IG21 and IG22 to a fold boundary line L2 representing a boundary between the original part of image IG0 and folded part of the image IG1. The folded boundary line L2 corresponds to a position of the wound part of image IM2 in FIG. 7 which has been separated from the cylindrical image CYL and comprising upper and lower fold boundary lines L21, L22.

In order to effect a transformation of the folded part of image into an image projected on a plane including the original part of image IG0 in FIG. 8, the position of each picture element on the original screen may sequentially be transformed in accordance with a procedure of transformation processing in FIGS. 1(A) through 1(D).

In a first transformation step, the fold line L1 is set on an original part of image OIG on a x-y plane in an orthogonal coordinate system.

Figure 1A:
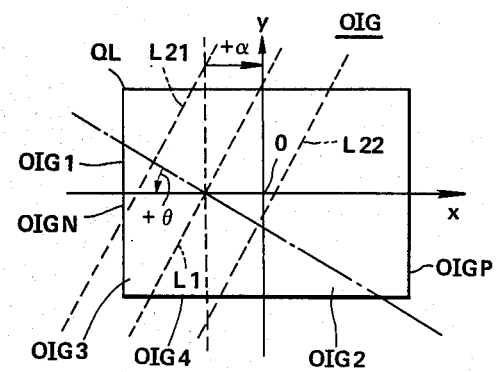
FIGS. 1(A) through 1(D) are schematic diagrams of image transformation procedure in the method for transforming image signals according to the present invention.
Figure 1B:
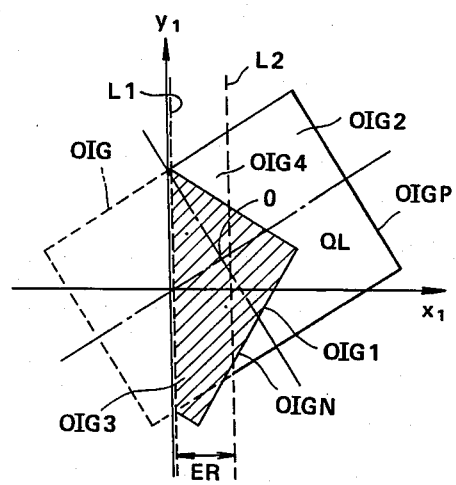

In a second transformation step, the original part of image OIG is translated in parallel to an $x_1$ axis direction by a distance $+\alpha$ so that the set fold line L1 is aligned with a $y_1$ axis and is rotated through $+\theta$ in a counterclockwise direction, as shown in FIGS. 1(A) and 1(B).

Thereafter, a part of image OIGN which belongs to a negative area in the $x_1$ axis direction $(-x_1, y_1)(-x_1, -y_1)$ is folded up along the $y_1$ axis (hence, the fold line L1) to overlap the part of image OIGN over the remaining part of image OIGP present in a positive area of the $x_1$ axis direction $(x_1, y_1)(x_1, -y_1)$.

Consequently, although the unfolded part of image OIGP is maintained as the original image OIG without being subjected to the transformation processing, the part of image OIGN is transformed to take a reversed form of the original image OIG (denoted by oblique lines). The whole image executed under such a folding transformation processing is represented on the $x_1 y_1$ plane.

Figure 1C:
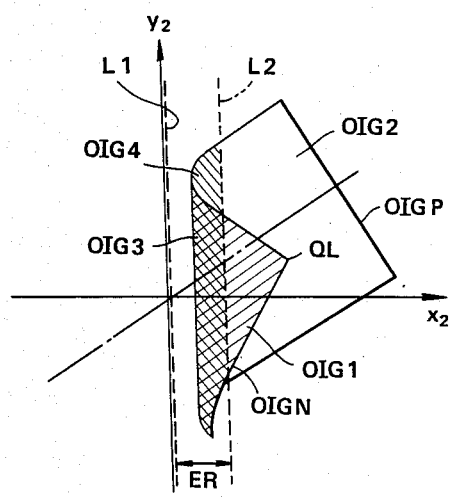

Next, in a third transformation step, a fold boundary line L2 is set which is parallel to the fold line L1 on the part of image OIGN and the part of image OIGP mutually overlapping and then a part of area ER (refer to FIG. 1(c)) between the parts of images OIGN and OIGP is non-linearly compressed. The non-linear compression is carried out in such a way that the part of the image wound on the cylindrical image CYL obtained through a perspective view from an upward direction as described above with reference to FIG. 8 is produced on the $x_2, y_2$ plane. This can be achieved by obtaining the position of each picture element on the cylindrical image calculated as a result of mapping the parts of plane images OIGN and OIGP present in the area ER on a surface of the cylindrical image extending toward a direction along the $y_2$ axis.

Consequently, the upper section of the part of image OIGN which belongs to the area ER is transformed into a part of image OIG3 representing the cylindrical surface through the non-linear compression processing with respect to the one axis of the $x_2$ axis direction.

A plane lower part of image OIGP which belongs to the area ER is transformed into the part of image OIG4 (refer to FIG. 1(c)) representing the cylindrical surface through the non-linear compression processing with respect to the $x_2$ axis. It should be noted that the parts OIG1, OIG2 other than the area ER which belong to the parts of images OIGN, OIGP shown in FIG. 1(C) are not subjected to the non-linear compression transformation.

Figure 1D:
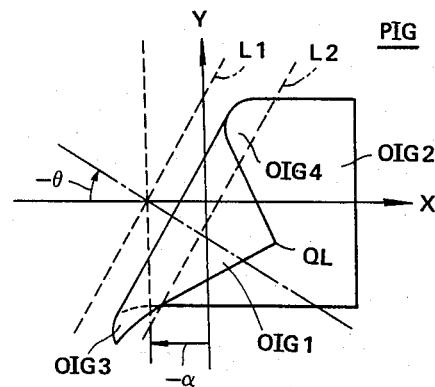

Next, in a fourth transformation step, the whole transformed image obtained as shown in FIG. 1(C) is rotated by $+\theta$ in the clockwise direction and translated in parallel (shifted) to the $x_2$ direction by $-\alpha$ as appreciated from FIG. 1(D).

The above-described parallel translation and rotation transformations means such steps as to return the position of the whole image moved by the parallel translation and rotation transformation executed as shown in FIG. 1(A) to the original image position.

In this way, all transformation operations are ended and the entire image on the screen PIG after the transformation operation represented on the X Y plane provides the same visual effect as the perspective view from the upward direction orthogonal to a plane including the original screen OIG when a part of the left upward corner QL in the original screen OIG (FIG. 1(A)) is folded up in a direction orthogonal to the fold line L1.

Figure 2:
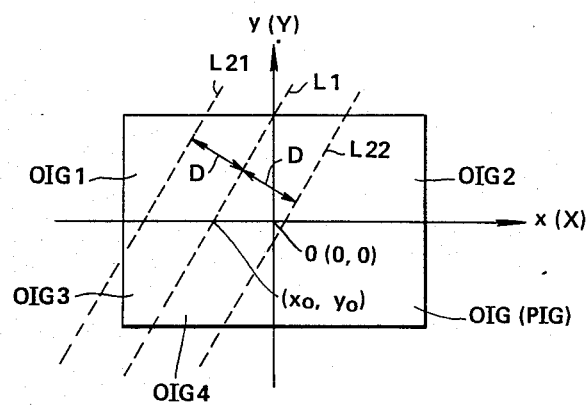
FIG. 2 is a schematic diagram of an unfolded transformed image.

If the transformed image PIG shown in FIG. 1(D) is unfolded on a plane as shown in FIG. 2, the part of transformed image OIG4 appears on the screen from the folded line L1 to the lower fold boundary line L22 which has been subjected to the non-linear compression and the part of transformed image OIG3 is also present between the fold line L1, an upper fold boundary line L21 drawn along a position which is axially symmetric to the lower fold boundary line L22 with respect to the fold line L1, and the upper part of image OIG1 which has not been subjected to the non-linear compression transformation is present outside of the upper fold boundary line L21.

On the other hand, if the partially transformed image PIG shown in FIG. 2 is compared with the original image OIG shown in FIG. 1(A), the part of transformed image OIG2 which has not been subjected to the non-linear compression transformation is subjected to such a transformation that a corresponding part of the original image OIG on the x-y plane is translated in parallel by the distance $+\alpha$ along the x axis (FIG. 1(A)), is then rotated by the angle $+\theta$ in the counterclockwise direction (FIG. 1(B)), and is, in turn, rotated in the clockwise direction and translated in parallel to the x axis direction by $-\alpha$ (FIG. 1(D)). However, during such a transformation procedure, the position of each picture element in the part of image OIG2 is finally returned to the original position of the corresponding picture element (pixcel) in the original image OIG. Consequently, the part of transformed image OIG2 is directly derived from the corresponding part of the original image OIG without any alternation. Thus, a position (X, Y) of each picture element on the X, Y plane in an area of the transformed part of image OIG2 can be expressed in the following equation by transforming a position (x, y) in the corresponding part of image present on the x, y plane.

$$\begin{bmatrix} X \\ Y \end{bmatrix} = \begin{bmatrix} x \\ y \end{bmatrix} \quad (1)$$

Next, the part of transformed image OIG4 is obtained by parallel translating the corresponding part of transformed image OIG by $+\alpha$ (FIG. 1(A)), rotating that part through the angle $+\theta$ in the counterclockwise direction (FIG. 1(B)), transforming that part in the non-linear compression (FIG. 1(C)), and rotating that part through the angle $+\theta$ in the clockwise direction and translating that part in parallel by the distance $-\alpha$. In this case, if a position of each picture element (x, y) present on the part of original image OIG corresponding to the part of transformed image OIG4 is expressed relatively to a reference position $(x_o, y_o)$, a position (X, Y) on the transformed image PIG of each picture element can be expressed in the following equation.

$$\begin{bmatrix} X \\ Y \end{bmatrix} = \begin{bmatrix} x_o \\ y_o \end{bmatrix} + R^*(-\theta) \begin{bmatrix} F & 0 \\ 0 & 1 \end{bmatrix} \times R^*(\theta) \begin{bmatrix} x & -x_o \\ y & -y_o \end{bmatrix} \quad (2)$$

In the above equation (2), a first term of the right side represents an amount of the parallel translation of the part of image with respect to the screen after processing of the non-linear compression transformation and $R^*(\theta)$ denotes a rotation matrix in which the image on the screen is rotated through $+\theta$ in the counterclockwise direction. The rotation matrix $R^*(\theta)$ may be expressed as $$R^*(\theta) = \begin{bmatrix} \cos\theta & -\sin\theta \\ \sin\theta & \cos\theta \end{bmatrix} \quad (3)$$

In addition, $R^*(\theta)$ denotes the coordinate position after the processing of the non-linear compression transformation is rotated through $-\theta$ in the counterclockwise direction and may be expressed as follows:

$$R^*(-\theta) = \begin{bmatrix} \cos\theta & \sin\theta \\ -\sin\theta & \cos\theta \end{bmatrix} \quad (4)$$

Furthermore, the second matrix in the equation (2) may be expressed as follows.

$$T^* = \begin{bmatrix} F & 0 \\ 0 & 1 \end{bmatrix} \quad (5)$$

In the equation (5), the right side denotes the execution of the non-linear compression transformation. In the equation (5), F denotes an operator for obtaining a value in the X ordinate after transformation as expressed below $$\begin{aligned} F \cdot x &= f(x) \\ &= D - r \cdot \sin\left(\frac{D-x}{r}\right) \end{aligned} \quad (6)$$

In the equation (6), r denotes a radius of the cylindrical image CYL(refer to FIGS. 1(A) through 1(D)) used for the non-linear compression transformation and is expressed by the following equation $$r = \frac{2}{\pi} \cdot D \quad (7)$$

Furthermore, the fourth matrix of the right-side second term of the above equation (2), i.e., $$\begin{bmatrix} x & -x_o \\ y & -y_o \end{bmatrix} \quad (8)$$

indicates that the position of each picture element (x, y) before the transformation processing is translated in parallel by the distance corresponding to the coordinates $(x_o, y_o)$ of the reference position. Consequently, the reference position $(x_o, y_o)$ is placed on a position which coincides with an origin of $x_1\, y_1$ plane (FIG. 1(B)) after transformation.

Next, the part of transformed image OIG3 is derived from the following procedure: the corresponding part of the original part of image OIG is translated in parallel by $+\alpha$ (refer to FIG. 1(A)), rotated through the angle $+\theta$ in counterclockwise direction and folded back (refer to FIG. 1(B)), transformed through the non-linear compression (refer to FIG. 1(C)), and finally rotated through the angle $+\theta$ in the clockwise direction together with the parallel translation by $-\alpha$ (refer to FIG. 1(D)).

In this case, the part of transformed image OIG3 is derived in the similar transformation procedure as the other part of transformed image OIG4 except the above-described fold back transformation procedure. The part of transformed image OIG3 can be expressed in the following equation.

$$\begin{bmatrix} X \\ Y \end{bmatrix} = \begin{bmatrix} x_o \\ y_o \end{bmatrix} + R^*(-\theta) \begin{bmatrix} -F & 0 \\ 0 & 1 \end{bmatrix} \times R^*(\theta) \begin{bmatrix} x & -x_o \\ y & -y_o \end{bmatrix} \quad (9)$$

It should be noted that a difference between the equations (2) and (9) lies in a term $-F$ which is included in the second matrix of the second term of the equation (9). The minus sign of the term F represents the original image being turned over.

Next, the part of transformed image OIG1 is derived from the following procedure: after parallel translation by $+\alpha$, the original image thereof is subjected to the rotation transformation through the angle $+\theta$ in the counterclockwise direction and is folded (refer FIG. 1(B)), and thereafter undergoes the rotation transformation through $+\theta$ in the clockwise direction and parallel translation by $-\alpha$. Consequently, each picture element in the part of transformed image OIG1 is transformed into a position with respect to the original image OIG which can be expressed in the following equation.

$$\begin{bmatrix} X \\ Y \end{bmatrix} = \begin{bmatrix} x_o \\ y_o \end{bmatrix} + R^*(-\theta) \begin{bmatrix} -1 & 0 \\ 0 & 1 \end{bmatrix} \times R^*(\theta) \begin{bmatrix} x & -x_o \\ y & -y_o \end{bmatrix} \quad (11)$$

A difference of the above equation (11) from the equation (9) lies in the use of a coefficient $-1$ in place of the operator $-F$ in the second matrix of the right-side second term. This represents that in the case of equation (11) the image before subjection of transformation is turned over through the fold back transformation processing without the non-linear compression transformation.

In this way, the parts of transformed image OIG2, OIG4, OIG3, and OIG1 constituting the transformed picture PIG can be obtained by transforming the image on the original part OIG into such positions as to satisfy the transformation equations represented by equations (1), (2), (9), and (11).

The equation (1) represents that the part of transformed image OIG2 is returned to the same position as the original part of image OIG as the result of a series of transformation steps. In this case, the following equation can be substituted for the equation (1) if the intermediate series of transformation processings are included.

$$\begin{bmatrix} X \\ Y \end{bmatrix} = \begin{bmatrix} x_o \\ y_o \end{bmatrix} + R^*(-\theta) \begin{bmatrix} 1 & 0 \\ 0 & 1 \end{bmatrix} \times R^*(\theta) \begin{bmatrix} x - x_o \\ y - y_o \end{bmatrix} \quad (12)$$

The transformation equations applied to all of the parts of image OIG2, OIG4, OIG3, and OIG1 can be represented in the following general formula.

$$\begin{bmatrix} X - x_o \\ Y - y_o \end{bmatrix} = R^*(-\theta) T^* R^*(\theta) \times \begin{bmatrix} x - x_o \\ y - y_o \end{bmatrix} \quad (13)$$

In the above equation (13), T* denotes a matrix in which the operator F or a numerical value substituted for the operator F is included for each arithmetic operation.

Figure 3:
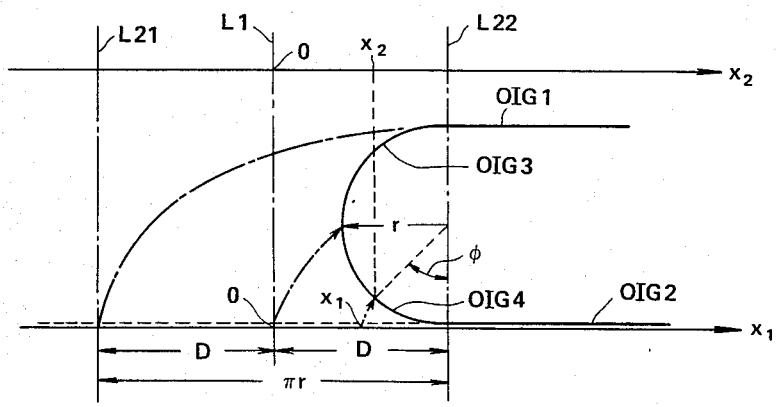
FIG. 3 is a schematic diagram for explaining the compression transform processing.

The non-linear compression transformation equation represented by the equation (6) can be obtained by the utilization of the relationship shown in FIG. 3.

In details, in the case when the double folded transformed image on the $x_1$, $y_1$ plane shown in FIG. 1(B) is subjected to the non-linear compression as shown in FIG. 1(C), the continuous parts OIG4, OIG3 of the image following the part of the transformed image OIG2 are folded back so as to be wound about the cylindrical image having a radius r.

In this case, supposing that when the part of transformed image OIG4 present between the fold line L1 on the $x_1$ axis and the folded boundary line L22 (having a width of D) is wound about an angular range of $\pi/2$ (90°) at a quarter lower part of cylinder surface, the position of a point $x_1$ on the part of transformed image OIG4 is moved to a position on the cylinder surface by an angle $\phi$ [rad] with respect to the folded boundary line L22 the position of the point on the cylinder surface can be expressed as follows with respect to an ordinate on the $x_2$ axis.

$$x_2 = D - r \sin \phi \quad (14)$$

In the above equation (14), the width D can be expressed as follows since the part of transformed image OIG4 having the width D is wound on the angular range of $\pi/2$ at a quarter lower part of an outer surface of the cylindrical image CYL.

$$D = \frac{\pi}{2} \cdot r \quad (15)$$

In addition, the following equation is established from the relationship between the angle $\phi$ for the transformed point of the ordinate $x_1$ and wound angle $\pi/2$ with respect to a center of the cylindrical image CYL.

$$\frac{\phi}{\pi/2} = \frac{D - x_1}{D} \quad (16)$$

If the equations (15) and (16) are substituted for the above equation (14), the following relationship is established.

$$x_2 = D - r \sin \frac{\pi}{2} \cdot \frac{D - x_1}{D} = \quad (17)$$

$$D - r \sin \frac{D - x_1}{r}$$

Although the transformation from the $x_1$, $y_1$ plane to the $x_2$, $y_2$ plane is described with reference to FIG. 3, the general formula can be expressed as the above-mentioned equation (6).

In order to display the transformed image obtained in the fourth transformation step (FIG. 1(D)) in accordance with the transformation procedure of FIGS. 1(A) through 1(D) as the output image on the screen, the data on the original image OIG (refer to FIG. 1(A)) is sequentially written into an input image memory together with a predetermined address data (, i.e., input image address data). If an output image address is inversely transformed into the input image address in order to sequentially access the input image address corresponding to the output image address required for the display of the output image after transformation of the input image, the transformed output image (refer to FIG. 1(D)) can be read out from the input image memory. To obtain the corresponding input image address from the output image address, in this way, image position data on which the transformation processing has been executed in the order beginning from FIG. 1(A) and ending to FIG. 1(D) is inversely transformed in the procedure starting from FIG. 1(D) and ending to FIG. 1(A) on the basis of the output image address.

The above-described inverse transformation can be derived by solving the general formula expressed in the equation (13) with respect to the term expressed below $$\begin{bmatrix} x - x_o \\ y - y_o \end{bmatrix} \quad (18)$$

Then the following equation is established.

$$\begin{bmatrix} x - x_o \\ y - y_o \end{bmatrix} = R^*(-\theta)(T^*)^{-1} R^*(\theta) \begin{bmatrix} X - x_o \\ Y - y_o \end{bmatrix} \quad (19)$$

Each value of picture element expressed in the above equation (19) may be obtained sequentially from the coordinates (X, Y) of the transformed image PIG as the coordinate (x, y) of the original image OIG.

Figure 4:
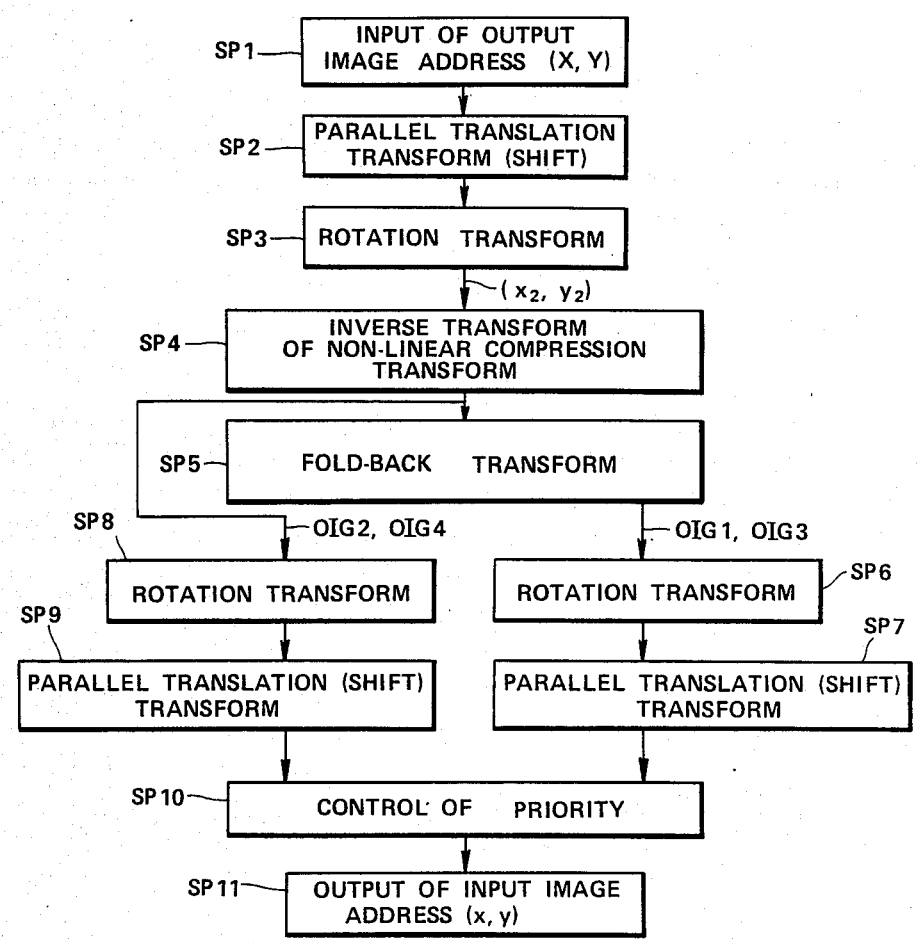
FIG. 4 is a flowchart of image signal transform processing method according to the present invention.

The above-described inverse transformation is executed in accordance with a processing sequence shown in FIG. 4.

In a step SP1 of FIG. 4, a position (X, Y) of transformed image PIG (hence, output image address) is inputted.

In the next steps SP2 and SP3, the parallel translation (shift) transformation and rotation transformation are executed on the basis of the following equation (20).

$$\begin{bmatrix} x_2 \\ y_2 \end{bmatrix} = R^*(\theta) \begin{bmatrix} X - x_o \\ Y - y_o \end{bmatrix} \quad (20)$$

The coordinate position $(x_2, y_2)$ on the $x_2$, $y_2$ plane shown in FIG. 1(C) is thus obtained.

In an image on the $x_2$, $y_2$ plane, the above-described fold line L1 is represented by the following equation.

$$x_2 = 0 \quad (21)$$

On the other hand, the above-described fold boundary line L2 (hence, corresponding to a center axial line of the cylindrical image about which the part of transformed image is wound) is expressed by the following equation.

$$x_2 = D \quad (22)$$

In addition, in the transformed image of the $x_2$, $y_2$ plane, any input image is not present in a negative area outside the fold line L1 and an inverse transform of the non-linear compression is necessary for an area between the fold line L1 and fold boundary line L2.

Next, in a step SP4 of FIG. 4 the inverse transform of the non-linear compression transformed image on the $x_2$, $y_2$ plane is executed so as to form the transformed image on the $x_1$, $y_2$ plane as described above with reference to FIG. 1(B).

Thereafter, in a step SP5, a fold back transform processing is executed so as to unfold the folded image.

Since in the transformation processing in the steps SP4 and SP5, there is no part of an image to be transformed in the following range on the $x_2$, $y_2$ plane, no transformation is executed.

$$x_2 < 0 \quad (23)$$

On the other hand, since in the area expressed below on the $x_2$, $y_2$ plane the two parts of image OIG3 and OIG4 are mutually overlapped, the inverse transform needs to be executed for each part of image.

$$0 \leq x_2 < D \quad (24)$$

For a point $(x_2, y_2)$ of the part of image OIG4 in which image is not turned over, a point $(x_{14}, y_{14})$ obtained on the $x_1$, $y_1$ plane through the transformation is expressed as follows.

$$\begin{bmatrix} X_{14} \\ Y_{14} \end{bmatrix} = \begin{bmatrix} F^{-1} & 0 \\ 0 & 1 \end{bmatrix} \begin{bmatrix} x_2 \\ y_2 \end{bmatrix} \quad (25)$$

For a point $(x_2, y_2)$ within the part OIG3 in which the image is turned over, a point $(x_{13}, y_{13})$ obtained on the $x_1$, $y_1$ plane through the transformation is expressed as follows.

$$\begin{bmatrix} X_{13} \\ Y_{13} \end{bmatrix} = \begin{bmatrix} -F^{-1} & 0 \\ 0 & 1 \end{bmatrix} \begin{bmatrix} x_2 \\ y_2 \end{bmatrix} \quad (26)$$

In the equations (25) and (26), $F^{-1}$ denotes an operator for executing the inverse transform of the non-linear compression represented by F.

In addition, for a point $(x_2, y_2)$ within the part OIG2 in which the contents of image is not turned over, a point $(x_{12}, y_{12})$ obtained on the $x_1$, $y_1$ plane through the transformation is expressed as follows.

$$\begin{bmatrix} X_{12} \\ Y_{12} \end{bmatrix} = \begin{bmatrix} 1 & 0 \\ 0 & 1 \end{bmatrix} \begin{bmatrix} x_2 \\ y_2 \end{bmatrix} \quad (28)$$

The above-described equation (28) indicates that neither inverse non-linear compression transform nor fold back transform is executed as appreciated from the use of coefficient 1 in place of the operator $F^{-1}$ On the other hand, for a point $(x_2, y_2)$ of the part OIG1 in which the contents of image is turned over, a point $(x_{11}, y_{11})$ obtained on the $x_1$, $y_1$ plane through the transformation is expressed as follows.

$$\begin{bmatrix} X_{11} \\ Y_{11} \end{bmatrix} = \begin{bmatrix} -1 & 0 \\ 0 & 1 \end{bmatrix} \begin{bmatrix} x_2 \\ y_2 \end{bmatrix} \quad (29)$$

The above-described equation (29) indicates that the contents of image is folded back as appreciated from the use of coefficient $-1$ in place of the operator $F^{-1}$.

Whereas the fold-back transform outputs for the parts of image OIG1 and OIG3 are obtained in the step SP5 and are subjected to the rotation and parallel translation transforms in the next steps SP6 and SP7, for the other parts of image OIG2 and OIG4, they are directly subjected to the rotation and parallel translation transformations without the fold-back transform in the next steps SP8 and SP9, respectively. Such series of transforms are executed respectively for the points $(x_{11}, y_{11})$, $(x_{12}, y_{12})$, $(x_{13}, y_{13})$, $(x_{14}, y_{14})$ on the $x_1$, $y_1$ plane related to the parts of transformed image OIG1, OIG2, OIG3, and OIG4. Consequently, the points $(x_{o1}, y_{o1})$, $(x_{o2}, y_{o2})$, $(x_{o3}, y_{o3})$, $(x_{o4}, y_{o4})$ on the x, y plane (refer to FIG. 1(A)) are derived from the following four equations, respectively.

$$\begin{bmatrix} x_{01} - x_o \\ y_{01} - y_o \end{bmatrix} = R^*(-\theta) \begin{bmatrix} x_{11} \\ y_{11} \end{bmatrix} \quad (30)$$

$$\begin{bmatrix} x_{02} - x_o \\ y_{02} - y_o \end{bmatrix} = R^*(-\theta) \begin{bmatrix} x_{12} \\ y_{12} \end{bmatrix} \quad (31)$$

$$\begin{bmatrix} x_{03} - x_o \\ y_{03} - y_o \end{bmatrix} = R^*(-\theta) \begin{bmatrix} x_{13} \\ y_{13} \end{bmatrix} \quad (32)$$

$$\begin{bmatrix} x_{04} - x_o \\ y_{04} - y_o \end{bmatrix} = R^*(-\theta) \begin{bmatrix} x_{14} \\ y_{14} \end{bmatrix} \qquad (33)$$

In this way, whenever the output image address allocated to each picture element included in the parts of transformed images OIG1, OIG2, OIG3, and OIG4 is specified by a sequential specification of an output address allocated to each picture element of the transformed image PIG described above with reference to FIG. 1(D), the input image address allocated to a picture element located at a position expressed by the corresponding one of the above-described equations (30) through (33) can be fetched from the input image memory as the read-out address.

Consequently, the image data constituting each part of the transformed image can be read out of the input image memory. It should be noted that it becomes practically necessary to select with a higher priority the image data on a part of transformed image which is located at an upper side of the mutually opposing parts of the transformed image, in a case when a plane image having a page turned-over effect as shown in FIG. 1(D) is produce.

Therefore, a control of the priority for each part of image is carried out as shown in step SP10 of FIG. 4.

The order of priority for the transformed image exhibiting the page turn-over effect in FIG. 1(D) is set in such a way that the part of image OIG1 has a higher priority than the part of image OIG2 and the part of image OIG3 has a higher priority than the part of image OIG4.

Thus, in the same way as a page of a book is turned over, a lower part of the front page hidden by the folded up part of the rear page is not displayed so that the input image address (x, y) which is capable of forming such an image as having more practical page turn-over effect can be produced in the final step SP11.

Figure 5:
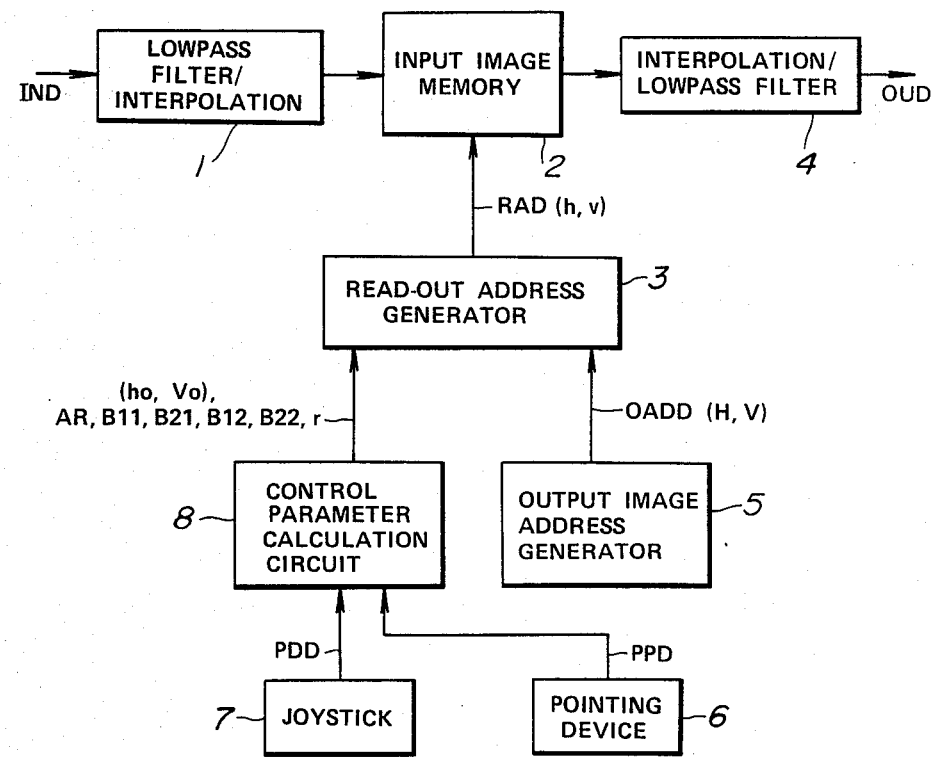
FIG. 5 is a circuit block diagram of the system for transforming image signals according to the present invention.

A system for transforming image signals which achieves the above-described series of transformation processing is shown schematically in FIG. 5.

As shown in FIG. 5, the input image data IND is sequentially read in the input image memory 2 via a low pass filter/interpolation circuit 1. The read image data is, in turn, read out by means of a read-out address signal RAD produced in a read-out address generator 3 and transmitted as an output image data OUD via an interpolation/low pass filter circuit 4.

The read-out address generator 3 receives an output image address signal OADD generated by an output image address generator 5.

Furthermore, the read-out address generator 3 receives a reference point signal ($h_o$, $v_o$) obtained through an arithmetic operation, rotation transformation matrix data AR, B11, B21, B12, and B22 calculated on the basis of angle $\theta$ in the rotation transform, and a value of radius r of above-described cylindrical image CYL, these signals and data being derived from a control parameter calculation circuit 8 on the basis of data PPD representing a preset parameter inputted from a pointing device 6 and position assignment data PDD inputted from a joystick (control stick) 7.

In addition, the read-out address generator 3 executes respective transform calculations for the four transformable parts of image OIG1, OIG2, OIG3, and OIG4 as described above with reference to FIGS. 1(A) through 1(D) on the basis of the output image address signals OADD, reference point signal ($h_o$, $v_o$), rotation transformation matrix data AR, B11, B21, B12, and B22, and radius r of the above-described cylindrical image CYL (in addition, a signal S-D to be described later) and read out the input image data which is to be the contents of image specified by the output image address fetched from the input image memory 2.

Figure 6:
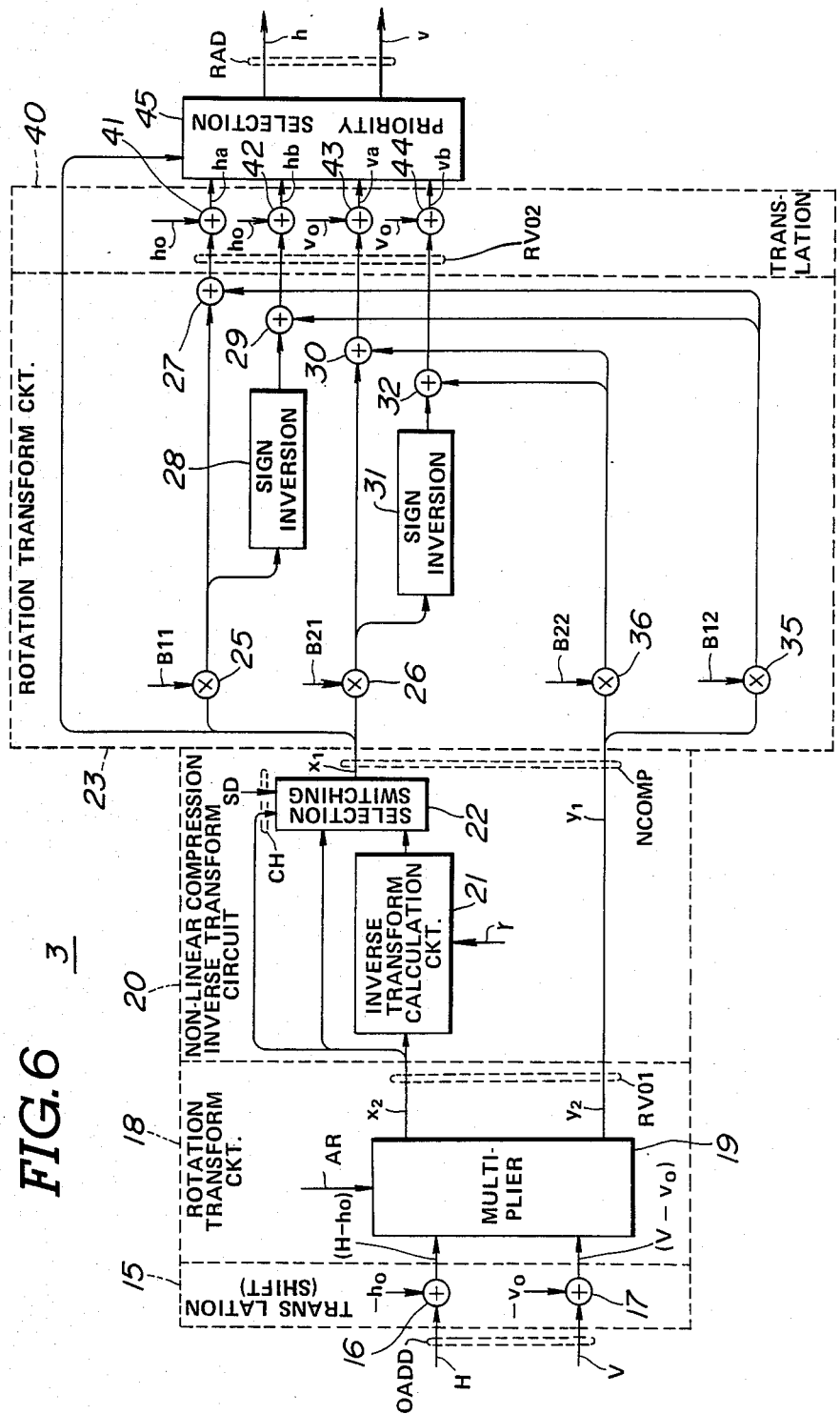
FIG. 6 is a schematic circuit block diagram of a readout address generator 3 shown in FIG. 5.

In addition, the read-out address generator 3 has an internal circuit configuration shown in FIG. 6 and executes a sequential transform processing of each signal corresponding to the inverse transform steps shown in FIG. 4.

Although in the image transform processing described above with reference to FIGS. 1(A) through 1(D) the arithmetic operation is carried out on the basis of square lattice coordinates between x, y plane and X, Y plane, both output image address signal OADD produced from the output image address generator 5 and reference point signal ($h_o$, $v_o$) produced from the control parameter calculation circuit 8 are signals represented by addresses of respective picture elements on a raster screen (this is called real addresses). The read-out address signals RAD to be supplied from the read-out address generator 3 to the input image memory 2 need to be converted to data having the contents of the real addresses.

Therefore, a relationship between each point (x, y) and (X, Y) on the x, y coordinates and X, Y coordinates and each real address (h, v) and (H, V) corresponding to the former coordinate point is defined in the following four equations.

$$x = \frac{X\text{size}}{H\text{size}} \cdot h \qquad (34)$$

$$X = \frac{X\text{size}}{H\text{size}} \cdot H \qquad (35)$$

$$y = \frac{Y\text{size}}{V\text{size}} \cdot v \qquad (36)$$

$$Y = \frac{Y\text{size}}{V\text{size}} \cdot V \qquad (37)$$

The reference point ($x_o$, $y_o$) on the basis of the above-described definition can correspond to the real address ($h_o$, $v_o$).

$$x_0 = \frac{X\text{size}}{H\text{size}} \cdot h_0 \qquad (38)$$

$$y_0 = \frac{Y\text{size}}{V\text{size}} \cdot v_o \qquad (39)$$

Such a conversion from the x, y coordinates and X, Y coordinates to corresponding real addresses (h, v) and (H, V) is executed simultaneously when the read-out address generator 3 executes the rotation transform.

The read-out address generator 3, as shown in FIG. 6, the signal (H, V) indicative of the real address supplied from the output image address generator 5 as the output image address signal OADD is supplied to adders 16, 17 of a parallel translation (shift) circuit 15.

The adders 16, 17 receive respective reference point signals ($h_o$, $v_o$) supplied from the control parameter calculation circuit 8 as subtraction inputs so as to produce the addition outputs (H−$h_o$) and (V−$v_o$) representing the parallel translation processing such that the reference point ($h_o$, $v_o$) is shifted to an origin. The addition outputs (H−h$_o$) and (V−v$_o$) are sent to a multiplier 19 in the rotation transform circuit 18.

It should be noted that the reference point signal (h$_o$, v$_o$) is derived from the control parameter calculation circuit 8 on the basis of the change in the output PDD of the joystick 7 and the position of the reference point (h$_o$, v$_o$) is changed by an operation of joystick 7 so that the visual effect of the page being folded gradually can be achieved.

The multiplier 19 multiplies the transformed data AR by the address signals H−h$_o$ and V−v$_o$. The transformed data AR is derived from the control parameter calculation circuit 8 and the value of R*($\theta$) in the above-described equation (20) is obtained in the control parameter calculation circuit 8 as data having the contents expressed in the following equation multiplied by conversion coefficients in the equations (34) through (37).

$$AR = \begin{bmatrix} \frac{X\text{size}}{H\text{size}} \cos\theta & -\frac{Y\text{size}}{V\text{size}} \sin\theta \\ \frac{X\text{size}}{H\text{size}} \sin\theta & -\frac{Y\text{size}}{V\text{size}} \cos\theta \end{bmatrix} \quad (40)$$

The data of angle $\theta$ for rotation transform is previous inputted to the control parameter calculation circuit 8 using the pointing device 6. The control parameter calculation circuit 8 outputs the rotation transform data AR calculated from the equation (40).

The output data RV01 appearing on an output terminal of the multiplier 19 is thus expressed by the following equation.

$$RV01 = \begin{bmatrix} \frac{X\text{size}}{H\text{size}} \cos\theta & -\frac{Y\text{size}}{V\text{size}} \sin\theta \\ \frac{X\text{size}}{H\text{size}} \sin\theta & -\frac{Y\text{size}}{V\text{size}} \cos\theta \end{bmatrix} \begin{bmatrix} H-h_0 \\ V-V_0 \end{bmatrix} \quad (41)$$

Since the rotation transform data AR includes a conversion coefficient for converting the address (h, v) and (H, V) to square lattice coordinates (x, y) and (X, Y) (as shown in the above equation (40)), the contents of output data RV01 are converted in the x, y coordinates and X, Y coordinates described with reference to the equations (18) through (33), on the basis of which the inverse transform arithmetic operation is executed at the subsequent stage of non-linear compression inverse transform circuit 20.

The non-linear compression inverse transform circuit 20 calculates the non-linear compression inverse transform using the data of radius r sent from the control parameter calculation circuit 8. Specifically, an inverse transform calculation circuit 21 constituting the non-linear compression inverse transform circuit 20 calculates data x$_2$ of the outputs RV01 produced from the previous stage of rotation transform circuit 18 in the axial direction of x$_2$ and the calculation result is sent to a selection switching circuit 22. The selection switching circuit 22 receives directly the data x$_2$ and enables the output of data on the part of image not requiring this inverse transform without passage through the non-linear compression inverse transform calculation circuit 21 when the data on the part of image not requiring such a transform is received.

In addition, the selection switching circuit 22 receives as selective switching control signals CH x$_2$ axis direction data x$_2$ and a transform region specification signal SD (corresponds to the region D in FIG. 2) indicating that data on the regions of the parts of transformed image OIG3 and OIG4 requiring the inverse transform of non-linear compressions have reached from the circuit 8.

In this way, the selection switching circuit 22 selects the output of the non-linear compression inverse transform calculation circuit 21 and outputs it as the output data x$_1$ of the non-linear compression inverse transform circuit 20 upon arrival of the data corresponding to the parts of transformed image OIG3 and OIG4 and outputs the data x$_2$ directly as the data x$_1$ constituting the output NCOMP of the non-linear compression inverse transform circuit 20 upon arrival of the picture element data of the other parts of transformed image OIG1 and OIG2. On the other hand, a y-axis component y$_2$ of the output RV01 from the multiplier 19 is directly outputted as the y-axis data y$_1$ of the output NCOMP.

The non-linear compression inverse transform circuit 21 calculates the above equations (25) and (26) by means of the following equation.

$$F^{-1} \cdot x = f^{-1}(x) \quad (42)$$

After the calculation is executed, a minus sign attached to the term of operator $F^{-1}$ as a minus exponent is operated arithmetically at the subsequent stage of rotation transform circuit 23 in order to simplify the construction.

The rotation transform circuit 23 executes the arithmetic operation of the equations (30) through (33) and the conversion of data represented by the square lattice coordinates (x$_1$, y$_1$) to the real address data (h, v). In details, in the arithmetic operation of the term R*(−$\theta$) in the above equations (30) through (33), the terms cos $\theta$ and −sin $\theta$ are provided for the axial direction of x, as appreciated from the equation (4). For the matrix of the right-side first term, the inverse transform operator $F^{-1}$ and minus sign in the coefficient 1 are used as shown in the equations (26) and (29).

Therefore, the inverse transform operator in the non-linear compression inverse transform matrix and sign in the term of the coefficient are moved to the term of x in the rotation matrix. Thereafter, when the arithmetic operation of the rotation transform matrix is executed as shown in the following four equations (43) through (46), the sign in the term x is exchanged so that the arithmetic operation for all parts of transformed image can be executed using the same construction shown in FIG. 6.

$$\begin{bmatrix} x_{o1}-x_o \\ y_{o1}-y_o \end{bmatrix} = R^*(-\theta) \begin{bmatrix} -1 & 0 \\ 0 & 1 \end{bmatrix} \begin{bmatrix} x_2 \\ y_2 \end{bmatrix} \quad (43)$$

$$= \begin{bmatrix} \cos\theta & \sin O \\ -\sin\theta & \cos\theta \end{bmatrix} \begin{bmatrix} -1 & 0 \\ 0 & 1 \end{bmatrix} \begin{bmatrix} x_2 \\ y_2 \end{bmatrix}$$

$$= \begin{bmatrix} -\cos\theta & \sin\theta \\ \sin\theta & \cos\theta \end{bmatrix} \begin{bmatrix} x_2 \\ y_2 \end{bmatrix}$$

-continued $$\begin{bmatrix} x_{o2} - x_o \\ y_{o2} - y_o \end{bmatrix} = R^*(-\theta) \begin{bmatrix} 1 & 0 \\ 0 & 1 \end{bmatrix} \begin{bmatrix} x_2 \\ y_2 \end{bmatrix}$$ (44)

$$= \begin{bmatrix} \cos\theta & \sin\theta \\ -\sin\theta & \cos\theta \end{bmatrix} \begin{bmatrix} x_2 \\ y_2 \end{bmatrix}$$

$$\begin{bmatrix} x_{o3} - x_o \\ y_{o3} - y_o \end{bmatrix} = R^*(-\theta) \begin{bmatrix} -F^{-1} & 0 \\ 0 & 1 \end{bmatrix} \begin{bmatrix} x_2 \\ y_2 \end{bmatrix}$$ (45)

$$= \begin{bmatrix} \cos\theta & \sin\theta \\ -\sin\theta & \cos\theta \end{bmatrix} \begin{bmatrix} -F^{-1} & 0 \\ 0 & 1 \end{bmatrix} \begin{bmatrix} x_2 \\ y_2 \end{bmatrix}$$

$$= \begin{bmatrix} -\cos\theta & \sin\theta \\ \sin\theta & \cos\theta \end{bmatrix} \begin{bmatrix} -F^{-1} & 0 \\ 0 & 1 \end{bmatrix} \begin{bmatrix} x_2 \\ y_2 \end{bmatrix}$$

$$\begin{bmatrix} x_{o4} - x_o \\ y_{o4} - y_o \end{bmatrix} = R^*(-\theta) \begin{bmatrix} F^{-1} & 0 \\ 0 & 1 \end{bmatrix} \begin{bmatrix} x_2 \\ y_2 \end{bmatrix}$$ (46)

$$= \begin{bmatrix} \cos\theta & \sin\theta \\ -\sin\theta & \cos\theta \end{bmatrix} \begin{bmatrix} -F^{-1} & 0 \\ 0 & 1 \end{bmatrix} \begin{bmatrix} x_2 \\ y_2 \end{bmatrix}$$

Therefore, the x-axis component $x_1$ among the outputs NCOMP of the non-linear compression inverse transform circuit 20 is sent to multipliers 25, 26 in which the rotation transform data B11 and B21 expressed in the following equations are multiplied by the component $x_1$.

$$B11 = \frac{-H\text{size}}{X\text{size}} \cos\theta$$ (47)

$$B21 = \frac{-V\text{size}}{Y\text{size}} \sin\theta$$ (48)

The multiplied output of the multiplier 25 is directly sent to an adder 27 and is sent to an adder 29 via a sign inverter 28. The multiplied output of the multiplier 26 is directly sent to an adder 30 and sent to an adder 30 via a sign inverter 31.

On the other hand, the y-axis component $y_1$ among the non-linear compression inverse transformed outputs NCOMP is sent to the multipliers 35, 36 in which the rotation transform data B12, B22 expressed in the following equations are multiplied by the y-axis component $y_1$.

$$B12 = \frac{-H\text{size}}{X\text{size}} \sin\theta$$ (49)

$$B22 = \frac{-V\text{size}}{Y\text{size}} \cos\theta$$ (50)

Thereafter, the multiplied output of the multiplier 35 is sent to the adders 27, 29 and that of the multiplier 36 is sent to the adders 30, 32.

The adders 27, 30 directly receive the results of multiplication from the multipliers 25, 26 respectively in which the x-axis component $x_1$ among the non-linear compression inverse transform outputs NCOMP is multiplied by the rotation transform data B11, B12. On the other hand, the adders 29, 32 receive the results of multiplication from the multipliers 25, 26 Via the sign inverters 28, 31. Consequently, the result of calculations from the equations (44) and (46) are sent to the adders 27, 30 and the result of calculations from the equations (43) and (45) is sent to the adders 29, 32, respectively.

In this way, the results of arithmetic operations RV02 using the above-described equations (43) through (46) are sent to the rotation transform circuit 23, the reference point data $h_o$, $h_o$, $v_o$, $v_o$ are respectively added to the adders 41, 42, 43, 44 constituting the parallel translation (shift) circuit 40.

This arithmetic operation means that the reference point ($h_o$, $v_o$) is returned to the original position.

Consequently, among the parts of original image OIG (refer to FIG. 1(A)), the addresses $h_a$, $h_v$ in the direction of x axis of the parts of image OIG1, OIG3, OIG2, and OIG4 corresponding to the rear and front portions of the transformed image PIG can be obtained.

On the other hand, output terminals of adders 43, 44 in the parallel translation (shift) circuit 40 appear addresses $v_a$, $v_b$ in the y-axis direction for the parts of image at the front and rear sides of the transformed image PIG among the original image OIG (refer to FIG. 1(A)).

These address signals $h_a$, $h_b$, $v_a$, and $v_b$ are sent as the address data (h, v) of the read-out address signal RAD, with the higher priority taken to the address data corresponding to the rear side parts of image, i.e., OIG1, OIG3 than the front side parts of image, i.e., OIG2, OIG4 as appreciated from FIG. 1(D).

According to the internal configuration of the read-out address generator 3 shown in FIG. 6, in a case when the generator 3 carries out an image transformation such that the input image can be transformed to the output image having the page turn-over effect, the read-out address generator 3 is so constructed as to generate sequentially the transformed output image address and to execute an arithmetic operation of the inverse transform of the sequentially generated output image address into the read-out address signal RAD so that the part of image data required for the appearance of page turn-over effect among the image data stored in the input image data can assuredly be read out.

Parameters representing a locus for a page to be turned over is preset in the control parameter calculation circuit 8 (refer to FIG. using the pointing device 6. In addition, the data on the reference point ($h_o$, $v_o$), rotation transform data AR, B11, B21, B12, and B22 calculated on the basis of angle $\theta$ for the rotation transform, and data on the radius of the cylindrical image CYL, these data being generated on the basis of the preset parameters, are modified by means of the joystick 7. Consequently, the reference point ($h_o$, $v_o$), angle $\theta$ of the rotation transform, and radius r of the above-described cylindrical image CYL can be changed in accordance with the positions specified by the joystick 7. Therefore, the output image data generating the page turn-over effect as if a series of changes from the beginning of page turn-over to the end of page turn-over were viewed perspectively from an upper position of the screen can be read out from the input image memory 2.

As appreciated from FIGS. 5 and 6, a major part of all arithmetic operations is achievable by the hardware construction so that the image signal transform system which can remarkably simplify part of a software arithmetic operation program as compared with the software execution for all arithmetic operations.

According to the present invention, the transformation of image signals with the page turn-over effect to be arithmetically operated as a three-dimensional surface can easily be achieved by the two-dimensional (plane) data transform and by one-dimensional compression transform of the part of output image constituting the surface part of the output image. Consequently, the effect of page turning over can easily be achieved with a simple construction.

It will be clearly understood by those skilled in the art that the foregoing description is made in terms of preferred embodiment and various changes and modifications may be made without departing from the scope of the invention which is to be defined by the appended claims.

What is claimed is:

1. A method for effecting a transformation of a video image on a video screen, comprising the steps of:
   (a) storing an input video image in a memory device;
   (b) defining a two-dimensional address plane in a memory area of said memory device;
   (c) providing a first line on said address plane to divide said address plane into first and second regions;
   (d) providing second and third lines on said first and second regions of said address plane;
   (e) calculating address data of said address plane for providing transferred address data so that said address data of said first region are symmetrically transformed with respect to said first line;
   (f) calculating said address data between said first and second lines and between said first and third lines so that said address data between said first and second lines and between said first and third lines are nonlinear compression transformed along an axis perpendicular to said first line; and
   (g) reading out said input video image from said memory device and generating an output video image according to said calculated address data, whereby said output image can be viewed such as to be turned over along said first line.

2. The method according to claim 1, which further comprises:
   (h) transforming parallel translation and rotation for said address plane so that said first line coincides with one axis of said address plane before said transforming of the parallel translation and rotation is carried out; and
   (i) transforming inverse parallel translation and rotation for said address plane so that axes of said address plane are returned to an original condition.

3. The method as set forth in claim 1 wherein step (d) further includes the step of providing said second and third lines in parallel to each other.

4. The method as set forth in claim 3, wherein, when the parallel second and third lines are parallel to said first line, an imaginary cylinder is defined over which the video image is turned.

5. The method as set forth in claim 3 where the distance between said first line and said second line is about the same as the distance between said first line and said third line.

6. The method as set forth in claim 1 wherein said second line and said third line define an imaginary geometrical shape over which the video image is transformed.

7. The method as set forth in claim 1 further including the step of moving said first line to achieve a turnover effect.

8. The method as set forth in claim 1 wherein the step (d) further includes the step of varying the distance between said second and third lines.

9. The method as set forth in claim 1 further including a step of displacing said first line on said address plane in a predetermined direction so that said output image is turned over a geometrical shape having said first line as its axis.

10. The method as set forth in claim 9 wherein a radius of said geometrical shapes varies with time.

11. The method as set forth in claim 9 wherein said predetermined direction is normal to said first line.

12. A system for effecting a transformation of a video image on a video screen, comprising:
   (a) first means for storing input image data;
   (b) second means for sequentially generating a positional output image address signal;
   (c) third means for presetting parameters representing a locus on which an output of the video image is turned over as if a sheet of paper were folded up;
   (d) fourth means for sequentially generating position designation signals indicative of a displacement of the input image on a two-dimensional plane;
   (e) fifth means for calculating values including a positional reference point signal of the input image on the two-dimensional plane on the basis of which the input image is displaced, rotation transform matrix data based on a given angle through which the two-dimensional plane is rotated, and a radius data on a virtual geometrical image on which part of the input image is wound, said positional reference point signal, rotation transform matrix data, and radius data being based on present parameters drived from said third means and position designation signals derived from said fourth means;
   (f) sixth means for executing transform arithmetic operations for transformable parts of an output video image, said transformable parts being defined by a first part representing a rear part of the output video image which is wound on an upper surface of said geometrical image as viewed through the video screen, a second part representing a front part of the output video image which is outside of a projection portion of the geometrical image, a third part representing the front part of the output video image which is wound on a lower surface of said geometrical image as viewed through the video screen, and a fourth part representing the rear part of the output image which is outside of said wound first part so as to overlap on said second part, on the basis of the reference point signal, rotation transform matrix data, and radius data of said geometrical image calculated by said fifth means and reading out the input image data the contents of which are to be the output image and specified by the positional output image address signal generated by said second means; and
   (g) seventh means for displaying the input video image whose data are stored in said first means and read out from said first means by said sixth means according to the positional output image address signal on the video screen so that the whole video screen can be viewed as if a sheet of paper were being folded up about said geometrical image.

13. The system according to claim 12, wherein said fourth means generates sequentially the position designation signals in such a way that the respective values of the reference point, the first predetermined angle, and radius are varied so that the output video image is gradually turned on.

14. The system according to claim 13, wherein said fourth means is a joystick.

15. The system according to claim 12, wherein said sixth means comprises:
   (a) a first parallel translation circuit which receives the output address signal from said second means and reference point signal from said fifth means and adds both signals for each axis of the two-dimensional plane for processing a parallel translation such that the reference point of the output image is moved to an origin of the two-dimensional plane;
   (b) a first rotation transform circuit for processing a rotation transform of the positional output signal of said parallel translation circuit through a first predetermined angle so that a center axis of said geometrical image coincides with one axis of the two-dimensional plane using one of the rotation transform matrix data derived from said fifth means;
   (c) a non-linear compression inverse transform circuit for processing an inverse transform of non-linear compression transformation for said first and third pats with respect to only the other axis of the two-dimensional plane orthogonal to the one axis thereof using the radius data from said fifth means and for passing the data on said second and fourth parts and on the one axis of the two-dimensional plane without being subjected to the inverse transform of non-linear compression;
   (d) a second rotation transform circuit for processing a rotation transform of the positional output signal of said-nonlinear compression inverse transform circuit through a second predetermined angle so that the center axis of said cylindrical image is returned to the original position using the other rotation matrix data derived from said fifth means;
   (e) a second parallel translation circuit which receives the positional output signal from said second rotation transform circuit and positional reference point signal from said fifth means and add both signals for each axis of the two-dimensional plane for processing the parallel translation such that the reference point of the output image is returned to the original position; and
   (f) a priority selection circuit for selecting with a higher priority the positional output signal on said first and fourth parts of the output image from said second parallel translation circuit than that on said second and third parts of the output image and outputting the positional output signal of said second parallel translation circuit as the read-out address signal to said first means.

16. The system according to claim 15, wherein said positional output image address signal generated by said fourth means and positional reference point signal calculated by said fifth means are signals representing addresses of respective picture elements on a raster screen.

17. The system according to claim 16, wherein said first and second rotation transform circuits carry out the rotation transform processings using a conversion coefficient for converting each positional address data on the two-dimensional plane to each positional address data on the raster screen.

18. The system according to claim 15, wherein said second rotation transform circuit processes the rotation transform together with a fold back transform processing for the positional address data outputted from said non-linear compression inverse transform circuit corresponding to said first and fourth parts of the output video image.

19. The system according to claim 15, wherein said second predetermined angle is a minus value of said first determined angle.

20. The system according to claim 15, wherein a coordinate system of the two-dimensional plane is changed whenever the transform processing is carried out.

21. A method for effecting a transformation of a video image on a video screen, comprising the steps of:
   (a) defining a two-dimensional address plane within a memory area;
   (b) storing input video image within said memory area so that each video data of a picture element thereof is placed at a corresponding address;
   (c) virtually placing a cylinder shaped image whose radius of a section thereof is varied on the address plane defined in said step (a) and winding a part of said address plane on said cylinder shaped image;
   (d) displacing said cylinder shaped image along a predetermined direction on said address plane with its radius varied with time so that the address plane is turned over along the predetermined direction;
   (e) transforming parallel translation and rotation for the whole address plane, a non-linear compression with respect to the predetermined direction for front and rear parts of the address plane which are wound on a surface of said cylinder shaped image as viewed vertically through the video screen, and a fold back of the rear part of the address plane;
   (f) inverse transforming the transformed address data obtained in said step (e) so as to unfold the output video image and reading out an inverse transformed image address data with a priority taken for the turned over part of output image as input image address data;
   (g) displaying the input image on the video screen on the basis of the input image address, whereby the video image on the video screen can be viewed as if a page were turned over.

* * * * *